US009919612B2

(12) United States Patent

Mizuno et al.

(10) Patent No.: US 9,919,612 B2

(45) Date of Patent: Mar. 20, 2018

(54) VEHICLE AND POWER RECEIVING DEVICE

(71) Applicant: TOYOTA JIDOSHA KABUSHIKI KAISHA, Toyota-shi, Aichi-ken (JP)

(72) Inventors: Tomoyuki Mizuno, Okazaki (JP); Yoshiyuki Igarashi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

(21) Appl. No.: 14/901,641

(22) PCT Filed: Jun. 20, 2014

(86) PCT No.: PCT/IB2014/001126

§ 371 (c)(1),
(2) Date: Dec. 28, 2015

(87) PCT Pub. No.: WO2014/207531

PCT Pub. Date: Dec. 31, 2014

(65) Prior Publication Data

US 2016/0152154 A1 Jun. 2, 2016

(30) Foreign Application Priority Data

Jun. 28, 2013 (JP) ................................ 2013-136364

(51) Int. Cl.
*B60L 1/00* (2006.01)
*B60L 11/18* (2006.01)
(Continued)

(52) U.S. Cl.
CPC ......... *B60L 11/1842* (2013.01); *B60L 3/0069* (2013.01); *B60L 11/123* (2013.01);
(Continued)

(58) Field of Classification Search
CPC .................................................. B60L 11/1842
See application file for complete search history.

(56) References Cited

U.S. PATENT DOCUMENTS

2011/0309674 A1 12/2011 Kamachi
2013/0015700 A1 * 1/2013 Ichikawa ............. H04L 25/028
307/9.1

FOREIGN PATENT DOCUMENTS

CN 102823209 A 12/2012
EP 2 309 617 A1 4/2011
(Continued)

OTHER PUBLICATIONS

Partial Translation of Aug. 5, 2014 Office Action issued in Japanese Patent Application No. 2013-136364.

*Primary Examiner* — Daniel Puentes
(74) *Attorney, Agent, or Firm* — Oliff PLC

(57) ABSTRACT

A vehicle includes: an electrical storage device; an inlet; a power conversion unit; and an ECU configured to: (a) determine whether the connector connected to the inlet is a charge connector for charging the electrical storage device or a discharge connector for feeding electric power to an external device on the basis of a first signal that is supplied via the inlet; (b) determine whether the discharge connector is a power extracting connector for feeding electric power to a single load or a facility connector for feeding electric power to a facility on the basis of a second signal that is supplied via the inlet when the ECU determines that the connector is the discharge connector; and (c) control an exchange of electric power between the inlet and the electrical storage device with the use of the power conversion unit on the basis of the determination of the connector.

7 Claims, 14 Drawing Sheets

(51) Int. Cl.

| | |
|---|---|
| ***B60L 3/00*** | (2006.01) |
| ***B60L 11/12*** | (2006.01) |
| ***B60L 11/14*** | (2006.01) |

(52) U.S. Cl.

CPC ........... *B60L 11/14* (2013.01); *B60L 11/1816* (2013.01); *B60L 11/1825* (2013.01); *B60L 2230/12* (2013.01); *Y02E 60/721* (2013.01); *Y02T 10/6217* (2013.01); *Y02T 10/7005* (2013.01); *Y02T 10/7077* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y04S 10/126* (2013.01)

(56) References Cited

FOREIGN PATENT DOCUMENTS

| | | | |
|---|---|---|---|
| EP | 2557746 | A1 | 2/2013 |
| JP | 5099281 | B1 | 12/2012 |
| JP | 5126297 | B2 | 1/2013 |
| JP | 2013-051872 | A | 3/2013 |
| JP | 2013-055838 | A | 3/2013 |
| WO | 2010/140664 | A1 | 12/2010 |
| WO | 2013/065374 | A2 | 5/2013 |

* cited by examiner

F I G . 7B
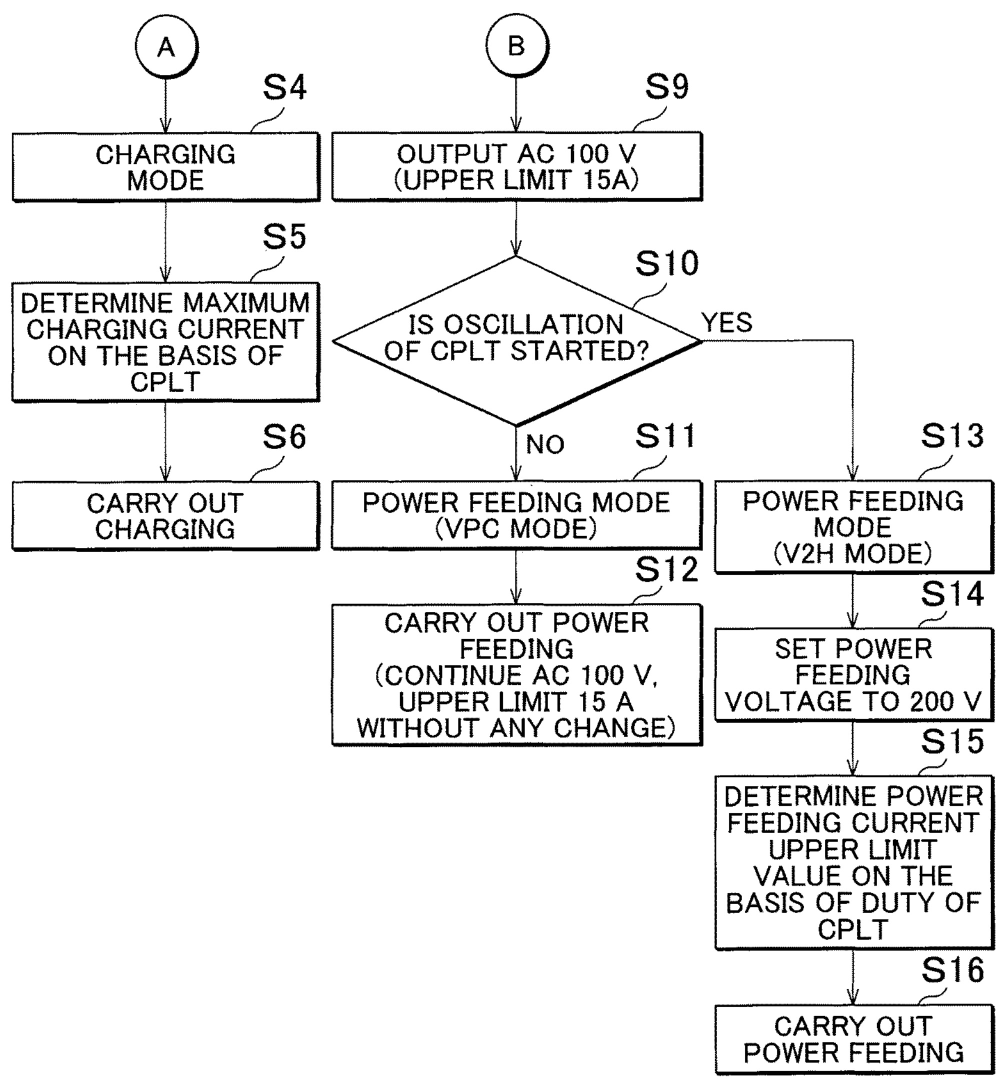

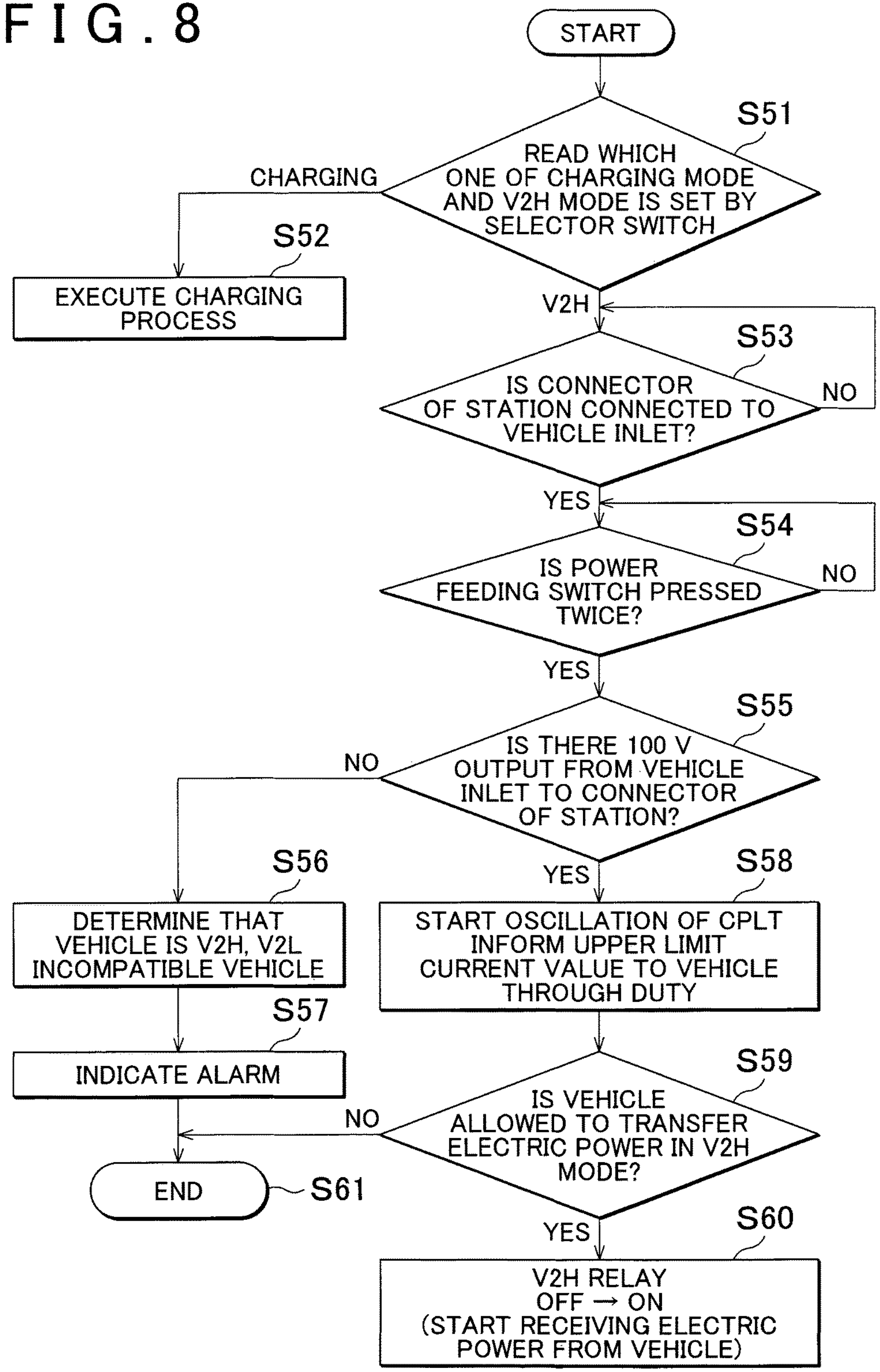
FIG. 8
START
S51
READ WHICH ONE OF CHARGING MODE AND V2H MODE IS SET BY SELECTOR SWITCH
CHARGING
S52
EXECUTE CHARGING PROCESS
V2H
S53
IS CONNECTOR OF STATION CONNECTED TO VEHICLE INLET?
NO
YES
S54
IS POWER FEEDING SWITCH PRESSED TWICE?
NO
YES
S55
IS THERE 100 V OUTPUT FROM VEHICLE INLET TO CONNECTOR OF STATION?
NO
YES
S56
DETERMINE THAT VEHICLE IS V2H, V2L INCOMPATIBLE VEHICLE
S57
INDICATE ALARM
S58
START OSCILLATION OF CPLT INFORM UPPER LIMIT CURRENT VALUE TO VEHICLE THROUGH DUTY
S59
IS VEHICLE ALLOWED TO TRANSFER ELECTRIC POWER IN V2H MODE?
NO
END
S61
YES
S60
V2H RELAY OFF → ON (START RECEIVING ELECTRIC POWER FROM VEHICLE)

VEHICLE AND POWER RECEIVING DEVICE

BACKGROUND OF THE INVENTION

1. Field of the Invention

The invention relates to a vehicle and a power receiving device and, more particularly, to a vehicle that is able to supply electric power to an external device and a power receiving device that is able to receive electric power from the vehicle.

2. Description of Related Art

There have been suggested an external power supply system that supplies electric power of an in-vehicle battery to a home or an external load in an emergency and a system that supplies electric power from an external power supply to a vehicle.

As one example of such a technique, for example, Japanese Patent No. 5126297 describes a power management system that manages electric power that is supplied from a vehicle to an electric facility.

As another example, Japanese Patent No. 5099281 describes an extracting device for extracting electric power from an in-vehicle battery to an external load by being connected to a charging inlet for charging the battery.

An existing general electric vehicle (hereinafter, referred to as charging-only vehicle) that is not assumed to supply electric power to an external device includes a battery that supplies electric power to a vehicle driving motor, and has an inlet for charging the battery from an external device. On the other hand, as described in Japanese Patent No. 5099281, there is also a vehicle (hereinafter, referred to as vehicle-to-load (V2L) vehicle) that is able to supply electric power from the inlet to an external load in an emergency, or the like, by connecting the extracting device to the inlet. Furthermore, as described in Japanese Patent No. 5126297, there is also a vehicle (hereinafter, referred to as vehicle-to-home (V2H) vehicle) that is able to supply electric power to a home, and it has been studied that the inlet of the vehicle is used for connection with a home.

SUMMARY OF THE INVENTION

In this way, in a situation in which vehicles, such as a charge-only vehicle, a V2L vehicle and a V2H vehicle, are mixedly present and objects that are connected to the inlet also mixedly include a charge connector, a discharge connector that is the above-described extracting device, a connector for coordination with a home, and the like, it is required to recognize which type is connected both at a facility side and a vehicle side. However, if the shape of each connector is changed, it is inconvenient at the time of charging that is common to three types of vehicles, and it is complicated at the time of manufacturing, development, or the like, due to an increase in the type of connector.

It is also conceivable that communication is carried out between a vehicle and a facility; however, cost also increases if a high-performance communication device is added.

The invention provides a vehicle that is able to identify multiple types of connectors, which are connected to an inlet, and a power receiving device that is able to identify multiple types of vehicles, which can be connected to a connector, while suppressing an increase in cost.

A first aspect of the invention provides a vehicle. The vehicle includes an electrical storage device, an inlet, a power conversion unit, and an ECU. The inlet is configured to feed electric power to an external device or charge the electrical storage device when a connector is connected to the inlet. The power conversion unit is configured to exchange electric power between the inlet and the electrical storage device. The ECU is configured to: (a) determine whether the connector connected to the inlet is a charge connector for charging the electrical storage device or a discharge connector for feeding electric power to an external device on the basis of a first signal that is supplied via the inlet; (b) determine whether the discharge connector is a power extracting connector for feeding electric power to a single load or a facility connector for feeding electric power to a facility on the basis of a second signal that is supplied via the inlet when the ECU determines that the connector is the discharge connector; and (c) control an exchange of electric power between the inlet and the electrical storage device with the use of the power conversion unit on the basis of the determination of the connector.

In the vehicle according to the first aspect of the invention, the first signal may be transmitted by using a proximity detection signal that is used to detect that the connector is connected to the inlet. The second signal may be transmitted by using a control pilot signal that is used to inform a charging condition to a charging facility outside the vehicle at the time of charging.

In the vehicle according to the first aspect of the invention, the ECU may be configured to: (d) control the power conversion unit such that electric power is fed from the inlet at a predetermined upper limit current when the ECU determines that the connector connected to the inlet is the power extracting connector; and (e) control the power conversion unit such that electric power is fed from the inlet at an upper limit current determined on the basis of the second signal when the ECU determines that the connector connected to the inlet is the facility connector.

In the vehicle according to the first aspect, the ECU may be configured to: (f) control the power conversion unit such that a supply voltage that is output to power terminals of the connector becomes a first supply voltage when the ECU determines that the connector is the discharge connector; and (g) control the power conversion unit such that a supply voltage that is output to the power terminals of the connector changes from the first supply voltage when the ECU further determines that the discharge connector is the facility connector thereafter.

A second aspect of the invention provides a power receiving device for outputting charging power to a vehicle and receiving electric power from the vehicle. The power receiving device includes a connector, a circuit, a supply voltage detector, and an ECU. The connector is configured to be connected to an inlet of the vehicle. The circuit is configured to transmit a first signal and a second signal to the vehicle via the connector. The supply voltage detector is configured to detect a level of a voltage that is supplied from the vehicle to power terminals of the connector. The ECU is configured to: (h) cause the circuit to transmit the second signal after the supply voltage detector detects that the voltage that is supplied from the vehicle to the power terminals of the connector is a first supply voltage; and (i) determine that the vehicle connected to the connector is of a vehicle type that is able to feed electric power to a facility placed outside the vehicle when the supply voltage detector detects that the voltage that is supplied from the vehicle to the power terminals of the connector has changed from the first supply voltage in response to the second signal.

In the power receiving device according to the second aspect of the invention, the first signal may be transmitted by using a proximity detection signal that is used to detect that the connector is connected to the inlet, and the second signal may be transmitted by using a control pilot signal that is used to inform a charging condition to a charging facility outside the vehicle at the time of charging.

The power receiving device according to the second aspect of the invention may further include an operating unit configured to carry out operation for transmitting the first signal. The circuit may include a first circuit that transmits the first signal in response to operation of the operating unit and a second circuit that transmits the second signal by changing from an oscillation stopped state to an oscillating state.

According to the invention, while the common inlet is used, the vehicle is able to identify multiple types of connectors that are connected to the inlet, and the power receiving device is able to recognize what kind of vehicles are vehicles of multiple types that can be connected to the connector.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a flowchart that shows procedure in which a control device of the power station carries out mode recognition and recognizes the vehicle;

DETAILED DESCRIPTION OF EMBODIMENTS

Figure 1:
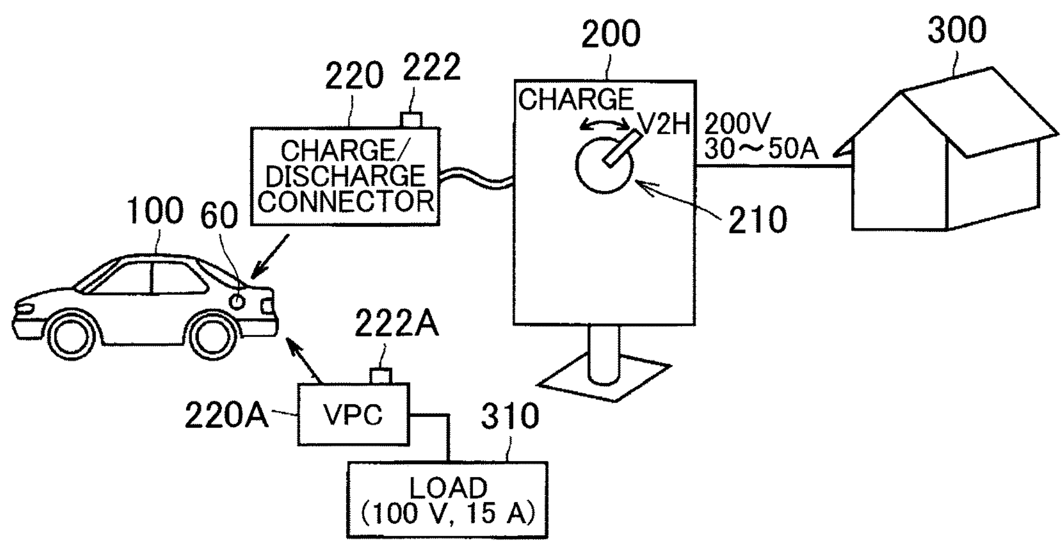
FIG. 1 is a view that shows the configuration of a power supply system to which a vehicle and a power receiving device according, to an embodiment of the invention are applied.

Hereinafter, an embodiment of the invention will be described in detail with reference to the accompanying drawings. Like reference numerals denote the same or corresponding components in the drawings, and the description thereof will not be repeated.

FIG. 1 is a view that shows the configuration of a power supply system to which a vehicle and a power receiving device according to the embodiment of the invention are applied. As shown in FIG. 1, the power supply system includes the vehicle 100 and a power station 200.

The vehicle 100 includes an inlet 60. One of a charge/discharge connector 220 and a vehicle power connector (VPC) 220A is allowed to be connected to the inlet 60.

The VPC 220A corresponds to the extracting device described in Japanese Patent No. 5099281. When the VPC 220A is connected to the inlet 60 of the vehicle, electric power that is supplied from the vehicle 100 to a load 310 is allowed to be extracted. The load 310 is, for example, a load of AC 100 V and an upper limit of 15 A, and is an electric rice-cooker, or the like. By connecting the VPC 220A, a required load is allowed to be used, for example, in an emergency, such as a power failure or when visiting a place where there is no outdoor power supply. A power feeding switch 222A is provided in the VPC 220A. A user is allowed to cause the vehicle 100 to start power feeding to the load by operating the power feeding switch 222A.

The power station 200 includes a selector switch 210. The selector switch 210 is a switch for selecting whether to cause the power station 200 to operate in the charging mode in which a battery of the vehicle is charged or to cause the power station 200 to operate in the V2H mode in which supply of electric power is received from the vehicle.

The charge/discharge connector 220 also includes a power feeding switch 222. The user is allowed to cause the vehicle 100 to start power feeding to a home by operating the power feeding switch 222. For example, an electric power of AC 200 V and 30 to 50 A is supplied to the home.

In the V2H mode, the vehicle may be charged and electric power is supplied from the vehicle on the basis of whether electric power is deficient or surplus. In the following description, an example in which the vehicle is not charged and power feeding is carried out from the vehicle to a home, or the like, in the V2H mode will be described.

Figure 2:
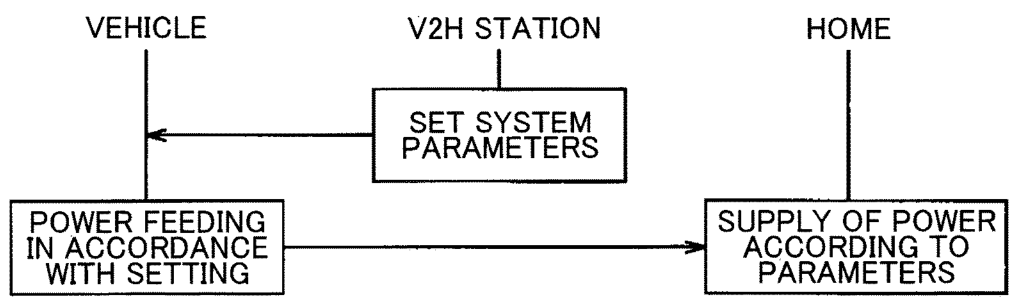
FIG. 2 is a view for illustrating the outline of procedure until power feeding is started from the vehicle to a home in a V2H mode.

FIG. 2 is a view for illustrating the outline of procedure until power feeding is started from the vehicle to the home in the V2H mode. As shown in FIG. 1 and FIG. 2, in the V2H mode, initially, set system parameters for power feeding are provided from the power station 200 (also referred to as V2H station) to the vehicle.

In response to this, the vehicle carries out power feeding to the home in accordance with the set system parameters. Thus, the home is supplied with electric power according to the parameters compliant with a facility, such as a cabinet panel and house wiring.

The vehicle that is used in many applications, such as V2L and V2H, carries out power feeding to an unspecified load. Therefore, the vehicle needs to recognize information (voltage and upper limit current) of a load. The information corresponds to the above-described system parameters. Means for transmitting parameters from the power station to the vehicle generally include wireless communication, power line communication, and the like.

However, addition of a new communication device, such as wireless communication and power line communication, causes an increase in the cost of the vehicle.

In an energy management-type V2H in which electric power is stored in the battery of the vehicle at the time of surplus electric power of photovoltaic power generation or at the time of a low cost in nighttime, and the stored electric power is used at the time when the consumption of electric power is large, an exchange of a large amount of data is required between the vehicle and a management controller. Therefore, in the energy management-type V2H, a high-performance communication device is indispensable.

However, in emergency V2H in which electric power is transferred from the vehicle to the home in an emergency, such as occurrence of a power failure, power feeding is allowed to be carried out with necessary minimum parameters. In the emergency V2H, addition of a new communication device may lead to excessive quality.

Therefore, in the present embodiment, parameters in the V2H mode are transmitted in a method that does not significantly depart from Charging Standard IEC61851-1. Charging Standard IEC61851-1 includes a control pilot signal CPLT and a proximity detection signal PISW. In the present embodiment, communication between the vehicle and the power station is carried out by using these signals.

Figure 3:
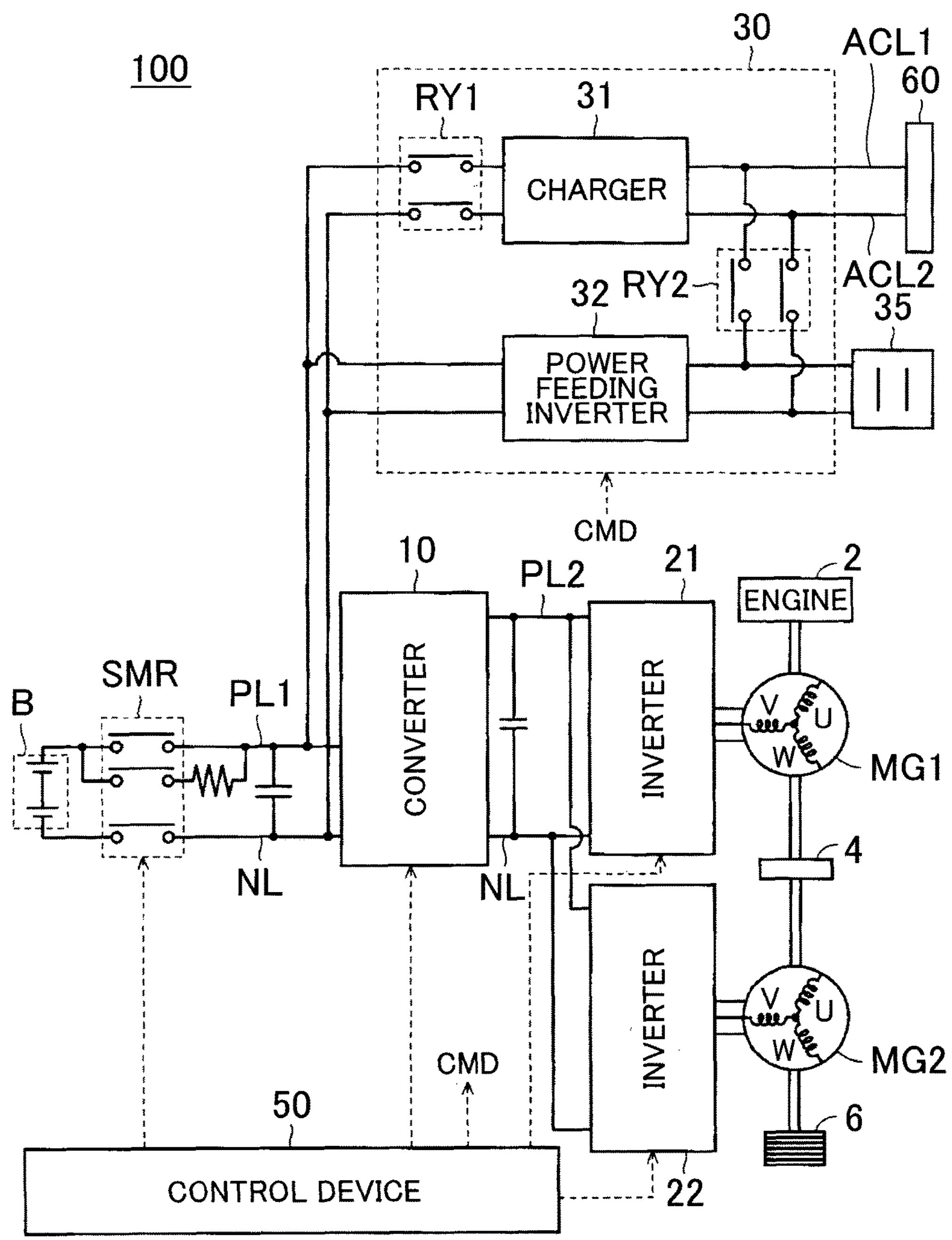
FIG. 3 is a block diagram that shows the configuration of the vehicle.

FIG. 3 is a block diagram that shows the configuration of the vehicle 100. In the following embodiment, the case where the vehicle is a hybrid vehicle will be described; however, the vehicle according to the invention is not limited to the hybrid vehicle. The vehicle may be an electric vehicle or a fuel cell vehicle.

As shown in FIG. 3, the vehicle 100 includes an engine 2, motor generators MG1, MG2, a power split device 4 and drive wheels 6.

The vehicle 100 further includes an electrical storage device B, a system main relay SMR, a converter 10, inverters 21, 22 and a control device 50. The vehicle 100 further includes a power converter 30, a receptacle 35 and the inlet 60.

The vehicle 100 is a hybrid vehicle that travels with the use of the engine 2 and the motor generator MG2 as power sources. Driving force generated by the engine 2 and the motor generator MG2 is transmitted to the drive wheels 6.

The engine 2 is an internal combustion engine, such as a gasoline engine and a diesel engine, that outputs power by burning fuel. An operating state, such as a throttle opening degree (intake air amount), a fuel supply amount and ignition timing, of the engine 2 is configured to be electrically controllable by a signal from the control device 50.

The motor generators MG1, MG2 are alternating-current rotary electric machines, and are, for example, three-phase alternating-current synchronous motors. The motor generator MG1 is used as a generator that is driven by the engine 2, and is also used as a rotary electric machine that is able to start the engine 2. Electric power that is obtained through power generation of the motor generator MG1 is allowed to be used to drive the motor generator MG2. Electric power that is obtained through power generation of the motor generator MG1 is allowed to be supplied to an external device that is connected to the vehicle 100. The motor generator MG2 is mainly used as a rotary electric machine that drives the drive wheels 6 of the vehicle 100.

The power split device 4, for example, includes a planetary gear mechanism having three rotary shafts, that is, a sun gear, a carrier and a ring gear. The sun gear is coupled to a rotary shaft of the motor generator MG1. The carrier is coupled to a crankshaft of the engine 2. The ring gear is coupled to a drive shaft. The power split device 4 splits the driving force of the engine 2 into power that is transmitted to the rotary shaft of the motor generator MG1 and power that is transmitted to the drive shaft. The drive shaft is coupled to the drive wheels 6. The drive shaft is also coupled to a rotary shaft of the motor generator MG2.

The electrical storage device B is a chargeable and dischargeable direct-current power supply, and is, for example, formed of a secondary battery such as a nickel metal hydride battery and a lithium ion battery, a capacitor, or the like. The electrical storage device B supplies electric power to the converter 10, and is charged with electric power from the converter 10 during regeneration of electric power.

The system main relay SMR is provided between the electrical storage device B and the converter 10. The system main relay SMR is a relay for electrically connecting or interrupting the electrical storage device B to or from an electrical system. The on/off state of the system main relay SMR is controlled by the control device 50.

The converter 10 steps up voltage from the electrical storage device B, and supplies the stepped-up voltage to the inverters 21, 22. The converter 10 charges the electrical storage device B by stepping down voltage generated by the motor generator MG1 or the motor generator MG2 and rectified by a corresponding one of the inverters 21, 22.

The inverters 21, 22 are connected to the converter 10 in parallel with each other. The inverters 21, 22 are controlled by signals from the control device 50. The inverter 21 drives the motor generator MG1 by converting direct-current power, supplied from the converter 10, to alternating-current power. The inverter 22 drives the motor generator MG2 by converting direct-current power, supplied from the converter 10, to alternating-current power.

The power converter 30 is configured to be able to exchange electric power with an external device (not shown) that is connected to the inlet 60. In addition, the power converter 30 is configured to be able to supply electric power to an electrical device that is connected to the receptacle 35 provided in a vehicle cabin. The power converter 30 is connected to the inlet 60, the receptacle 35, and a positive electrode line PL1 and a negative electrode line NL between the system main relay SMR and the converter 10. The power converter 30 may be connected to power lines between the electrical storage device B and the system main relay SMR. The power converter 30 includes a charger 31, a power feeding inverter 32 and relays RY1, RY2.

The charger 31 is connected to the inlet 60 via power lines ACL1, ACL2, and is connected to the positive electrode line PL1 and the negative electrode line NL via the relay RY1. The charger 31 converts charging power, which is supplied from the external device connected to the inlet 60, to the voltage level of the electrical storage device B and then outputs the charging electric power to the electrical storage device B on the basis of a signal CMD from the control device 50, thus charging the electrical storage device B. Hereinafter, charging of the electrical storage device B with electric power from the external device is also termed "external charging".

The input side of the power feeding inverter 32 is connected to the positive electrode line PL1 and the negative electrode line NL, and the output side of the power feeding inverter 32 is connected to the inlet 60 via the relay RY2 and the power lines ACL1, ACL2. In addition, the output side of the power feeding inverter 32 is also connected to the receptacle 35.

The power feeding inverter 32 is able to convert electric power stored in the electrical storage device B to supplying electric power that is supplied to the electrical device connected to the receptacle 35, and to output the converted electric power to the electrical device.

In the VPC mode, the power feeding inverter 32 is able to convert at least one of electric power stored in the electrical storage device B and electric power generated by the motor generator MG1 to supplying electric power that is supplied to the load 310 via a VPC connector 220A (shown in FIG. 1) connected to the inlet 60, and to output the converted electric power to the load 310.

In the V2H mode, the power feeding inverter 32 is able to convert at least one of electric power stored in the electrical storage device B and electric power generated by the motor generator MG1 to a facility 300, such as a home, via the charge/discharge connector 220 (shown in FIG. 1) connected to the inlet 60, and to output the converted electric power to the facility 300.

In the power feeding inverter 32, the voltage and the upper limit current are determined on the basis of the signal CMD from the control device 50.

In the specification, outputting at least one of the electric power of the electrical storage device B and the electric power generated by the motor generator MG1 from the vehicle to a load or home outside the vehicle is termed "power feeding".

Each of the relays RY1, RY2 opens or closes on the basis of the signal CMD from the control device 50. The relay RY1 is closed at the time of charging from an external device and is opened at the time of power feeding to an external device. The relay RY2 is opened at the time of charging from an external device and is closed at the time of power feeding to an external device.

The inlet 60 is configured to be able to serve as both a power feeding port for feeding electric power of the vehicle 100 to an external load, a home, or the like, and a charging port for charging the vehicle 100 from an external power supply. As will be described later, the inlet 60 includes terminals to which power lines are connected and terminals to which signal lines are connected. The signal lines include a signal line for detecting whether a connector of a cable connected to an external device is connected to the inlet 60.

The control device 50 determines a target driving force, which is transmitted to the drive wheels 6, on the basis of an accelerator operation amount, a brake depression amount, a vehicle speed, and the like. The control device 50 controls the engine 2 and the motor generators MG1, MG2 such that the engine 2 and the motor generators MG1, MG2 are placed in an operating state where it is possible to efficiently output the target driving force. In addition, when an external load or an external power supply is connected to the inlet 60, the control device 50 selects and carries out one of charging from the external power supply and power feeding to the external load by controlling the power converter 30 and the relays RY1, RY2.

In the above-described configuration, the control device 50 is required to control the power feeding inverter 32 on the basis of an external device, or the like, connected to the vehicle 100 at the time of carrying out power feeding to the external device, or the like. Specifically, a required voltage of an external device or a home and a maximum value of current (hereinafter, referred to as maximum current value) that is allowed to be received by a load device depend on each external device or each home, so the control device 50 is required to output a voltage corresponding to a required voltage or limit an output current such that the output current does not exceed a maximum current value.

Therefore, in the vehicle 100 according to the present embodiment, by using the signal line (proximity detection signal PISW) for detecting whether the connector of a cable connected to the external device is connected to the inlet 60 and a signal line (control pilot signal CPLT) that has been used so far in charging control, it is detected whether the connector of the cable connected to the external device is the VPC 220A shown in FIG. 1 or the charge/discharge connector 220 and, when the connector is the charge/discharge connector, it is detected whether the setting of the power station 200 is the "charging mode" or the "V2H mode".

The power station 200 according to the present embodiment determines whether a connected vehicle is a vehicle compatible with the V2H mode on the basis of whether there is a change in output voltage from the vehicle side after the control pilot signal CPLT is transmitted.

Figure 4:
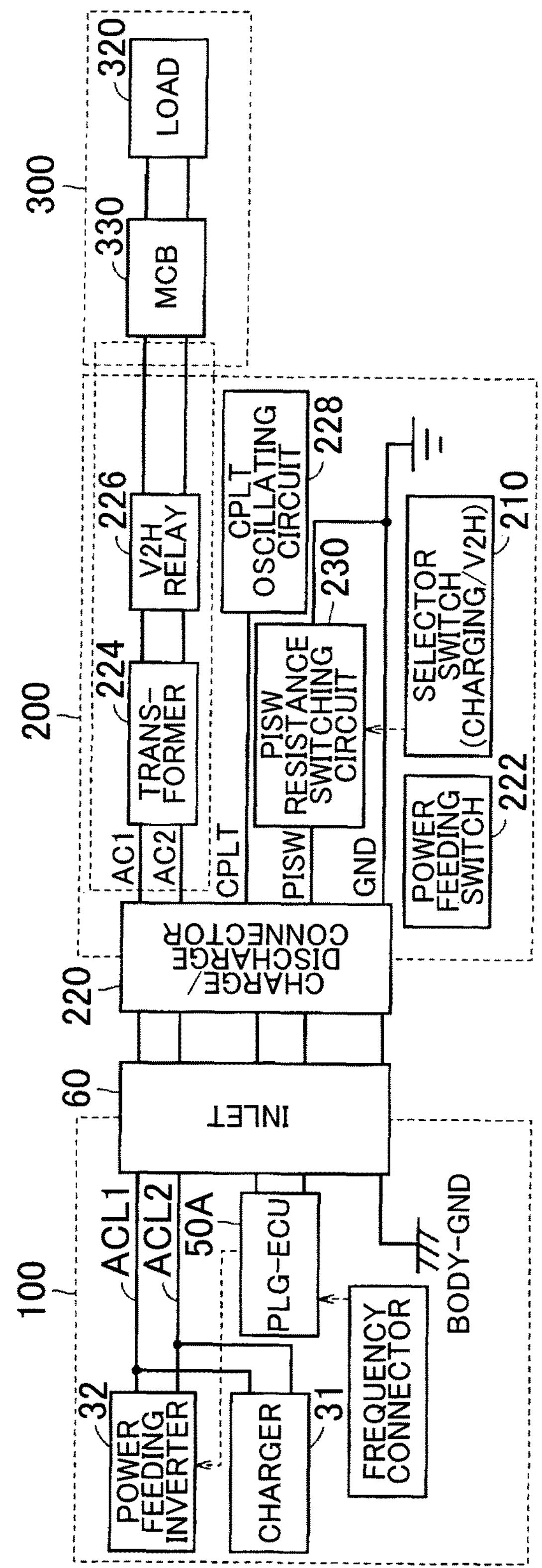
FIG. 4 is a block diagram that shows the schematic configuration of the vehicle and a power station according to the present embodiment.

FIG. 4 is a block diagram that shows the schematic configuration of the vehicle and the power station according to the present embodiment. As shown in FIG. 4, the vehicle 100 includes the charger 31, the power feeding inverter 32, a PLG-ECU 50A, the power lines ACL1, ACL2 and the inlet 60. The PLG-ECU 50A is a portion that takes charge of control associated with plug-in charging within the control device 50 shown in FIG. 3. An alternating-current frequency that is output by a frequency connector is specified for the PLG-ECU 50A. The PLG-ECU 50A controls the power feeding inverter 32 such that the power feeding inverter 32 is caused to output electric power of the specified alternating-current frequency. The detailed configuration of the vehicle 100 is as described with reference to FIG. 3, so the description will not be repeated here.

The power station 200 includes a transformer 224, a V2H relay 226, a CPLT oscillating circuit 228, a PISW resistance selector circuit 230, the power feeding switch 222 and a mode selector switch 210.

The transformer 224 and the V2H relay 226 are provided in series with each other in the power lines AC1, AC2 connected to the vehicle-side power lines ACL1, ACL2. The power lines AC1, AC2 are connected to a load 320 via a miniature circuit breaker (MCB) 310 of the facility 300, such as a home.

Figure 5:
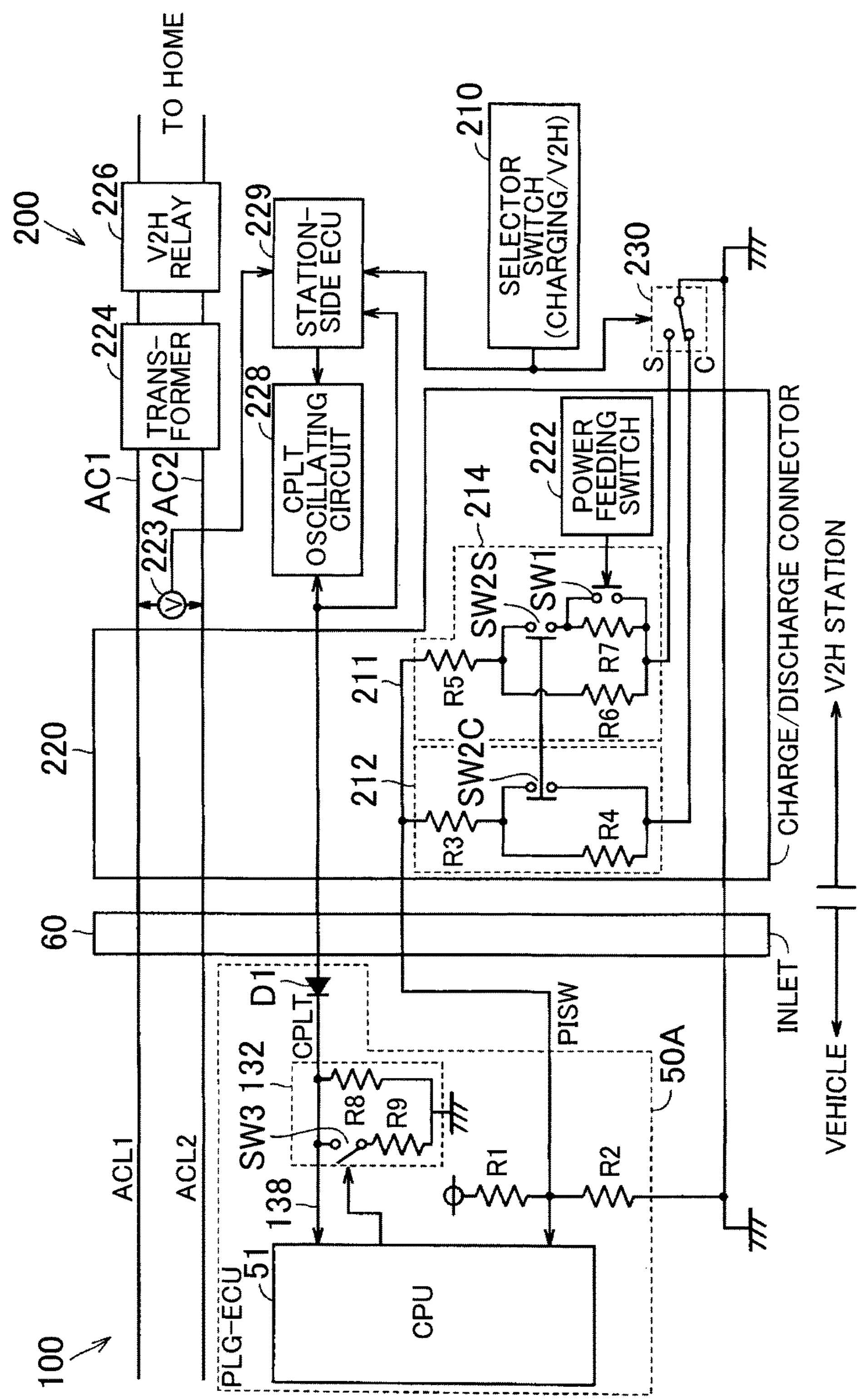
FIG. 5 is a circuit diagram that shows a partial configuration of the vehicle and the power station, associated with generation of signals PISW, CPLT.

FIG. 5 is a circuit diagram that shows the partial configuration of the vehicle and the power station, associated with generation of the signals PISW, CPLT. As shown in FIG. 5, the connector 220 includes connection detection circuits 212, 214 and the power feeding switch 222.

The power lines AC1, AC2 are power lines for transferring electric power between the vehicle 100 and the facility 300. Each of the connection detection circuits 212, 214 is a circuit for detecting a connection status of the connector 220 to the inlet 60 at the vehicle 100. The connection detection circuits 212, 214 are connected in parallel with each other between the selector circuit 230 and a signal line 211 for transmitting the connection signal PISW, indicating the connection status of the connector 220, to the vehicle 100, and one of the connection detection circuits 212, 214 is selectively used by the selector circuit 230.

The connection detection circuit 212 is a circuit that is selectively used in the charging mode. That is, when the user selects the charging mode by operating the selector switch 210, the selector circuit 230 is switched to a contact C side, and the connection status of the connector 220 is detected with the use of the connection detection circuit 212.

The connection detection circuit 212 includes resistors R3, R4 and a switch SW2C. The resistances R3, R4 are connected in series with each other between the signal line 211 and the contact C of the selector circuit 230. The switch SW2C is connected in parallel with the resistor R4.

The contact of the switch SW2C is opened when a lock release button (not shown) for releasing locking of connection of the connector 220 with the inlet 60 is operated into an on state by the user. As a result, the potential of the connection signal PISW (the potential of the signal line 211)

varies by a predetermined amount, and information that locking is released is provided to the PLG-ECU 50A.

The connection detection circuit 214 is a circuit that is selectively used in the V2H mode. That is, when the user selects the V2H mode by operating the selector switch 210, the selector circuit 230 is switched to a contact S side, and the connection status of the connector 220 is detected by the connection detection circuit 214.

The connection detection circuit 214 includes resistors R5 to R7, a switch SW2S and a switch SW1. The resistors R5, R6 are connected in series with each other between the signal line 211 and the contact S of the selector circuit 230. The serially-connected switch SW2S and resistor R7 are connected in parallel with the resistor R6. The switch SW1 is connected in parallel with the resistor R7.

The switch SW2S operates in synchronization with the switch SW2C. That is, when the lock release button is operated into the on state by the user, the contact of the switch SW2S is opened. As a result, the potential of the connection signal PISW (the potential of the signal line 211) changes by a predetermined amount, and information that locking is released is provided to the PLG-ECU 50A.

The power feeding switch 222 is operated by the user, and is a switch for allowing the user to issue instructions on the start of power feeding from the vehicle 100 in the V2H mode. When the power feeding switch 222 is operated into the on state by the user, the switch SW1 conducts and the resistor R7 is short-circuited. Thus, the potential of the connection signal PISW (the potential of the signal line 211) changes by a predetermined amount, and information that the power feeding switch 222 is operated into the on state is provided to the PLG-ECU 50A.

The selector circuit 230 selects one of the contacts C, S and connects the selected one to a ground line GND. The contacts C, S are respectively connected to the connection detection circuits 212, 214. The selector circuit 230 operates in synchronization with the selector switch 210 for allowing the user to switch between the charging mode and the V2H mode. When the charging mode is selected by the selector switch 210, the contact C is selected and connected to the ground line GND. When the V2H mode is selected by the selector switch 210, the contact S is selected and connected to the ground line GND.

The resistance values of the connection detection circuits 212, 214 are designed to be different from each other. A selected state of the selector switch 210 is provided to the PLG-ECU 50A by the potential of the connection signal PISW (the potential of the signal line 211).

The power station 200 includes a voltage sensor 223, the transformer 224, the V2H relay 226, the CPLT oscillating circuit 228, a station-side ECU 229, the selector switch 210 and the selector circuit 230. The voltage sensor 223 detects the voltage of each of the power lines AC1, AC2. The selector circuit 230 operates in synchronization with the selector switch 210 provided at the power station 200. The voltage sensor 223 corresponds to a "supply voltage detector".

The CPLT oscillating circuit 228 generates the pilot signal CPLT for exchanging information with the vehicle 100 in the V2H mode. For example, by operating the potential of the pilot signal CPLT in the PLG-ECU 50A of the vehicle 100 that receives the pilot signal CPLT, the V2H relay 226 provided in the power station 200 is remotely operated from the vehicle 100. By changing the duty ratio of the pilot signal CPLT, an electric power parameter (for example, a rated current, or the like, of the MCB 310) of a home is provided to the vehicle 100.

The PLG-ECU 50A of the vehicle 100 includes resistors R1, R2, a CPU 51 and a resistance circuit 132.

The resistor R1 is connected between a constant voltage node (for example, 5 V) and a signal line of the signal PISW. The resistor R2 is connected between the signal line of the signal PISW and a ground node. The potential of the connection signal PISW is determined by a combined resistance that is determined by a combination of the resistors R1, R2 and the connection detection circuit 212 or connection detection circuit 214 of the connector 220. In the CPU 51 to which the connection signal PISW is input, it is possible to detect a connection status of the connector 220, release of locking of connection, a power feeding request issued by the power feeding switch 222, or the like.

The resistance circuit 132 is a circuit for operating the potential of the pilot signal CPLT (the potential of the control pilot line) that is generated by the CPLT oscillating circuit 228 of the power station 200. The resistance circuit 132 includes resistors R8, R9 and a switch SW3. The resistor R8 is connected between the control pilot line 138 and the ground node. The serially-connected switch SW3 and resistor R9 are connected in parallel with the resistor R8. The switch SW3 is driven by the CPU 51.

By operating the switch SW3, the resistance value of the resistance circuit 132 varies, so the potential of the pilot signal CPLT (the potential of the control pilot line 138) varies. The variation in the potential of the pilot signal CPLT is detected at the power station 200. Thus, it is possible to remotely operate the V2H relay 226 provided in the power station 200 from the PLG-ECU 50A of the vehicle 100.

The CPU 51 detects the connection status of the connector 220, the state of the operation mode (the charging mode or the V2H mode), selected by the selector switch, release of locking of connection by the lock release button, or the like, on the basis of the connection signal PISW.

Figure 6:
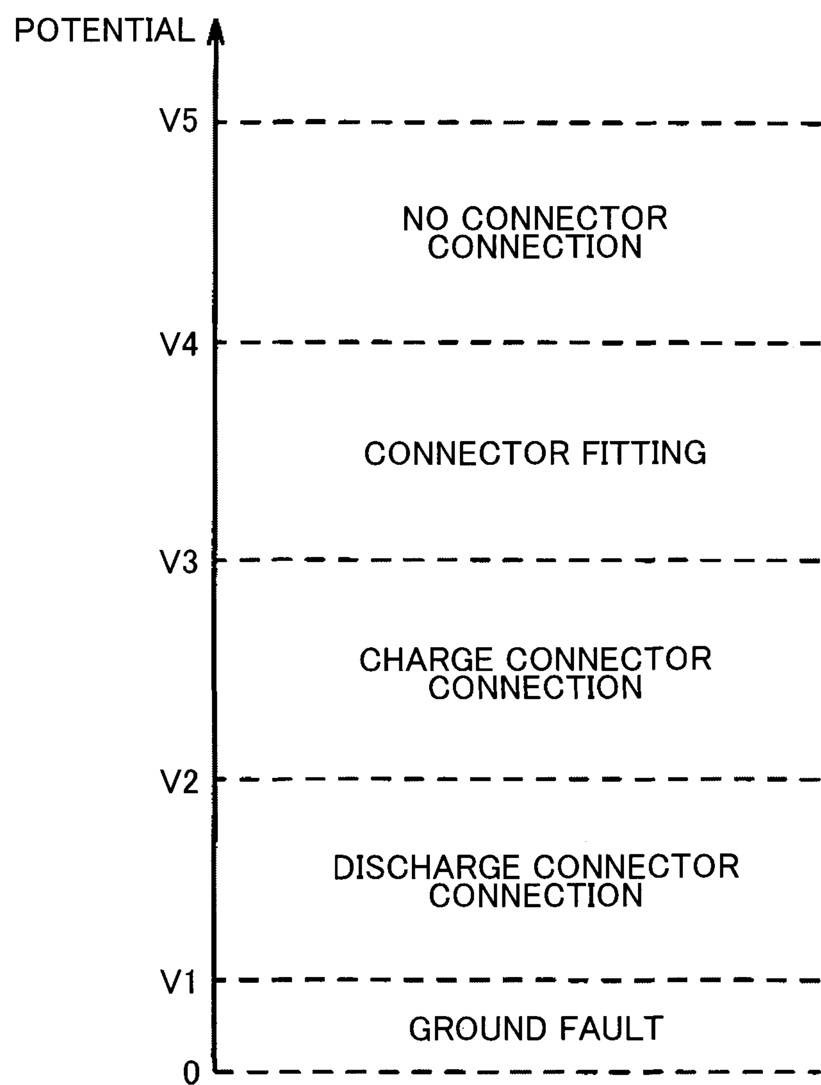
FIG. 6 is a view that shows an example of the relationship between the potential of the signal PISW and a connection status.

FIG. 6 is a view that shows an example of the relationship between the potential of the signal PISW and a connection status. The relationship between the potential of the connection signal PISW and a connection status is not limited to the relationship shown in FIG. 6, and may be variously modified.

As shown in FIG. 5 and FIG. 6, the resistance values of the resistors R1, R2 are set such that the potential of the connection signal PISW falls between a potential V4 and a potential V5 in a state where neither the charge/discharge connector 220 nor the VPC 220A shown in FIG. 1 is connected to the inlet 60 of the vehicle 100 (hereinafter, referred to as "no connector connection"). The CPU 51 is able to detect that the connection status is "no connector connection" by detecting the fact that the potential of the connection signal PISW falls between the potential V4 and the potential V5.

When the charge/discharge connector 220 is connected to the inlet 60 of the vehicle 100, the signal line of the connection signal PISW and the ground line GND are connected to the connection detection circuits 212, 214 of the charge/discharge connector 220.

The switches SW2C, SW2S are used to detect the state of a lock mechanism (not shown) provided in the charge/discharge connector 220. The lock mechanism is provided in order for the charge/discharge connector 220 not to be detached from the inlet 60. When the user connects or disconnects the charge/discharge connector 220 to or from the inlet 60, the user releases the lock mechanism by pushing an operation button provided in the charge/discharge connector 220. Each of the switches SW2C, SW2S enters an open state when the operation button is pushed, and enters a closed state when pushing operation is released.

The resistance values of the resistors R1 to R7 are set such that the potential of the connection signal PISW falls between a potential V3 and the potential V4 in a state where the charge/discharge connector 220 is connected to the inlet 60 and the lock mechanism of the charge/discharge connector 220 is released (hereinafter, also referred to as "connector fitting"). The CPU 51 is able to detect that the connection status is "connector fitting" by detecting the fact that the potential of the connection signal PISW falls between the potential V3 and the potential V4.

The resistance values of the resistors R1 to R4 are set such that the potential of the connection signal PISW falls between a potential V2 and the potential V3 in a state where the charging mode is selected by the selector switch 210, the charge/discharge connector 220 is connected to the inlet 60 and the lock mechanism of the charge/discharge connector 220 is activated (hereinafter, also referred to as "charge connector connection"). The CPU 51 is able to detect that the connection status is "charge connector connection" by detecting the fact that the potential of the connection signal PISW falls between the potential V2 and the potential V3.

The resistance values of the resistors R1, R2, R5 to R7 are set such that the potential of the connection signal PISW falls between the potential V1 and the potential V2 in a state where the V2H mode is selected by the selector switch 210, the charge/discharge connector 220 is connected to the inlet 60 and the lock mechanism of the charge/discharge connector 220 is activated (hereinafter, also referred to as "discharge connector connection"). The control device 50 is able to detect that the connection status is "discharge connector connection" by detecting the fact that the potential VP falls between the potential V1 and the potential V2.

Similar resistors are set for the VPC 220A such that the potential of the connection signal PISW falls between the potential V1 and the potential V2 when the VPC 220A shown in FIG. 1 is connected.

The CPU 51 detects a state where the signal line of the connection signal PISW is short-circuited to a body earth of the vehicle 100 (hereinafter, also referred to as "ground fault") when the potential of the connection signal PISW is lower than the potential V1.

Figure 7A:
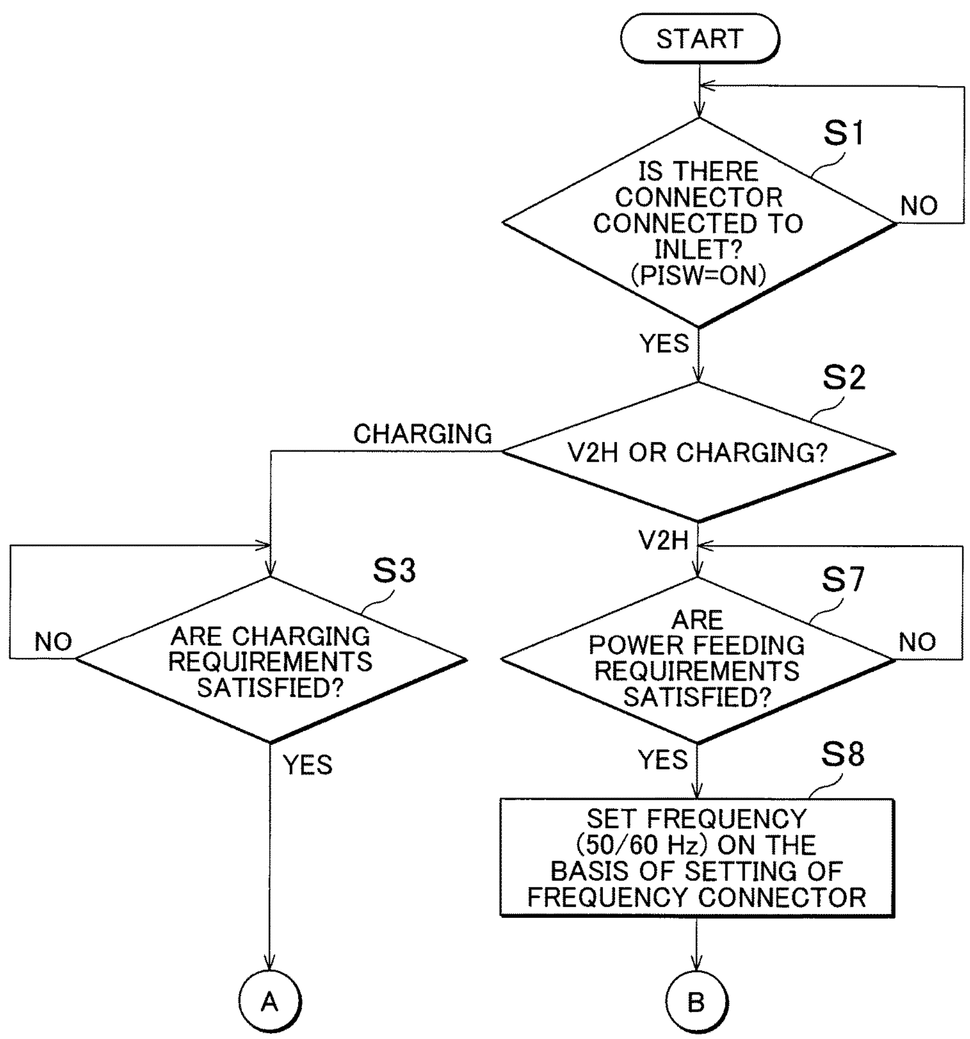
FIG. 7 is a flowchart that shows procedure in which a control device of the vehicle carries out mode recognition.

FIG. 7 is a flowchart that shows procedure in which the control device of the vehicle carries out mode recognition. As shown in FIG. 5 and FIG. 7, initially, in step S1, the PLG-ECU 50A determines whether there is any connector connected to the inlet 60. The PLG-ECU 50A determines that there is no connector connection when the potential of the connection signal PISW falls within the range of V4 to V5 as shown in FIG. 6, and determines that there is a connector connection when the potential of the connection signal PISW is lower than the potential V4.

Subsequently, the PLG-ECU 50A determines whether the mode selected by the selector switch 210 of the power station 200 is the charging mode or the V2H mode. The PLG-ECU 50A determines that the selected mode is the charging mode when the potential of the connection signal PISW falls within the range of V2 to V3 in FIG. 6, and determines that the selected mode is the V2H mode when the potential of the connection signal PISW falls within the range of V1 to V2.

When it is determined in step S2 that the mode is the charging mode, the process proceeds to step S3. In step S3, the PLG-ECU 50A waits until charging requirements are satisfied. The charging requirements include, for example, a situation that the vehicle is allowed to receive charging power, a situation that the power station is allowed to supply charging power to the vehicle, and the like.

When the charging requirements are satisfied in step S3, the process proceeds to step S4, and the mode is recognized as the charging mode. Subsequently, in step S5, a maximum charging current is determined on the basis of the control pilot signal CPLT. In step S6, charging is carried out. During charging, the control pilot signal CPLT changes as will be described later with reference to FIG. 9.

On the other hand, when it is determined in step S2 that the mode is the V2H mode, the process proceeds to step S7. In step S7, the PLG-ECU 50A waits until power feeding requirements are satisfied. The power feeding requirements include, for example, a situation that the vehicle is able to output electric power, a situation that the power station is able to receive electric power from the vehicle, and the like.

When the power feeding requirements are satisfied in step S7, the process proceeds to step S8. In step S8, the frequency (for example, 50 Hz, 60 Hz, or the like) of alternating-current power that is fed from the vehicle to the home is set on the basis of the setting of the frequency connector shown in FIG. 4, and the power feeding inverter 32 shown in FIG. 4 is caused to output AC 100 V at an upper limit current of 15 A from the inlet 60.

In step S10, the PLG-ECU 50A checks whether oscillation of the control pilot signal CPLT is started in response to the fact that AC 100 V is output to the inlet. When oscillation of the control pilot signal CPLT is not found in step S10, the process proceeds to step S11. When oscillation of the control pilot signal CPLT is found, the process proceeds to step S13.

In step S11, the PLG-ECU 50A determines that the mode is the power feeding mode (the VPC mode or the V2L mode). The voltage and upper limit current (for example, AC 100 V, upper limit 15 A) set in step S9 in advance are continuously output in step S12 without any change.

On the other hand, in step S13, the PLG-ECU 50A determines that the mode is the power feeding mode (V2H mode). The process proceeds to step S14, and the power feeding voltage is set to 200 V. The voltage may be changed at the time of manufacturing within the range of, for example, 200 V to 240 V, or the like, in conformity with a region in which the vehicle is used.

In step S15, the PLG-ECU 50A determines a power feeding current upper limit value on the basis of the duty ratio of the control pilot signal CPLT. The PLG-ECU 50A feeds electric power to the home in step S16.

FIG. 8 is a flowchart that shows procedure in which the control device of the power station carries out mode recognition and recognizes the vehicle.

As shown in FIG. 5 and FIG. 8, initially, when the process is started, a station-side ECU 229 reads in step S51 which one of the charging mode and the V2H mode the selector switch 210 for switching between the charging mode and the V2H mode is set. When the selector switch 210 has selected the charging mode in step S51, the process proceeds to step S52. In step S52, a similar process to the existing charging process is carried out.

When the selector switch 210 has selected the V2H mode in step S51, the process proceeds to step S53. In step S53, it is determined whether the charge/discharge connector 220 of the power station 200 is connected to the inlet 60 of the vehicle. For example, when the signal line 138 of the control pilot signal CPLT is connected to the connector 220, the potential of the signal CPLT is decreased by the resistor R8, so the station-side ECU 229 is allowed to recognize that the connector 220 is connected to the inlet 60 of the vehicle.

Subsequently, in step S54, the process waits again until the user presses the power feeding switch twice. When the user presses the power feeding switch twice, two pulses are detected from the signal PISW at the vehicle side, and this is recognized as a request to start power feeding. As a result, the process proceeds from S7 to S8 in FIG. 7, and a predetermined voltage (for example, AC 100 V) is output to the power lines of the inlet 60 of the vehicle. When the vehicle is a vehicle compatible with the operation of the V2H mode (or the V2L mode), the predetermined voltage is output; however, when the vehicle is a vehicle compatible with only charging, the predetermined voltage is not output.

In step S55, it is determined whether the predetermined voltage is output from the vehicle. The station-side ECU 229 is allowed to determine whether the predetermined voltage is output from the vehicle with the use of the voltage sensor 223.

When the predetermined voltage is not output from the vehicle in step S55, the process proceeds to step S56, and the station-side ECU 229 determines that the vehicle to which the connector 220 is connected is a V2H mode (and V2L mode) incompatible vehicle. An alarm indication is, for example, shown at a display unit of the station or informed by an alarm sound in order to notify the user of the incompatible vehicle in step S57, after which the process ends in step S61.

When the predetermined voltage is output from the vehicle in step S55, the process proceeds to step S58. In step S58, the station-side ECU 229 causes the CPLT oscillating circuit 228 to start oscillating, and informs the upper limit current value to the vehicle by the duty ratio of the waveform.

If the vehicle is a V2H mode compatible vehicle that is able to execute the processes of the flowchart described with reference to FIG. 7, the processes of step S13 to step S16 are executed, so AC 200 V should be output from the vehicle to the power lines AC1, AC2.

In step S59, it is determined whether the vehicle is able to carry out power feeding in the V2H mode. Specifically, when the output voltage has changed from AC 100 V to AC 200 V in response to the start of oscillation of the signal CPLT, the station-side ECU 229 determines that the vehicle is able to carry out power feeding in the V2H mode.

Determination is not necessarily carried out on the basis of whether the output voltage changes from AC 100 V to AC 200 V. Determination may be carried out by detecting the fact that the output voltage has changed in something in response to the start of oscillation of the signal CPLT. For example, if the voltage that is used in the V2H mode is not 200 V but 100 V, the voltage output at AC 100 V may be once decreased (or increased) in response to the start of oscillation of the CPLT and then returned to an original level. The station-side ECU 229 just needs to capture such a change with the use of the voltage sensor 223.

When it is determined in step S59 that the vehicle is able to carry out power feeding in the V2H mode, the process proceeds to step S60, and the station-side ECU 229 closes the V2H relay 226 and starts receiving electric power from the vehicle.

When it is determined in step S59 that the vehicle is not able to carry out power feeding in the V2H mode, it is conceivable that the vehicle is compatible with the V2L mode but is not compatible with the V2H mode. Therefore, control ends in step S61.

Figure 9:
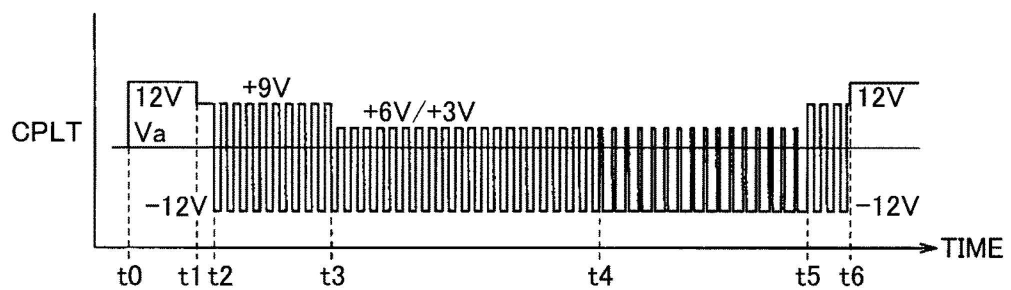
FIG. 9 is a waveform chart of the control pilot signal CPLT in a charging mode.

FIG. 9 is a waveform chart of the control pilot signal CPLT in the charging mode. In the charging mode, the vehicle 100 and the power station 200 carry out communication with the use of the control pilot signal CPLT as in the case where an electric vehicle is charged from an existing charging-only power station.

As shown in FIG. 5 and FIG. 9, when the connector 220 is connected to the inlet 60 at time t1, the resistance circuit 132 is connected, so the potential of the signal CPLT changes from 12 V to 9 V. Subsequently, the CPLT oscillating circuit 228 starts oscillating at time t2. A maximum current outputtable to the vehicle 100 is transmitted to the vehicle through the duty cycle of the waveform at this time.

The switch SW3 is closed at time t3 in order to indicate that the vehicle is able to receive electric power, and the high-level potential of the amplitude of the signal CPLT changes from 9 V to 6 V or 3 V. Charging is carried out between time t3 and time t4.

At time t4, the duty cycle of the waveform is changed such that the output current is reduced through a request from a power transmission network, a manual change of setting at the power station, or the like.

At time t5, the switch SW3 is opened in response to completion of charging at the vehicle side, and the high-level potential of the amplitude of the signal CPLT is returned to 9 V again. After that, oscillation stops in response to detachment of the connector 220 from the inlet 60 at time t6, and the signal CPLT is fixed at 12 V.

Communication that uses the above-described signal CPLT is carried out in step S4 to step S6 in FIG. 7 and step S52 in FIG. 8.

Figure 10:
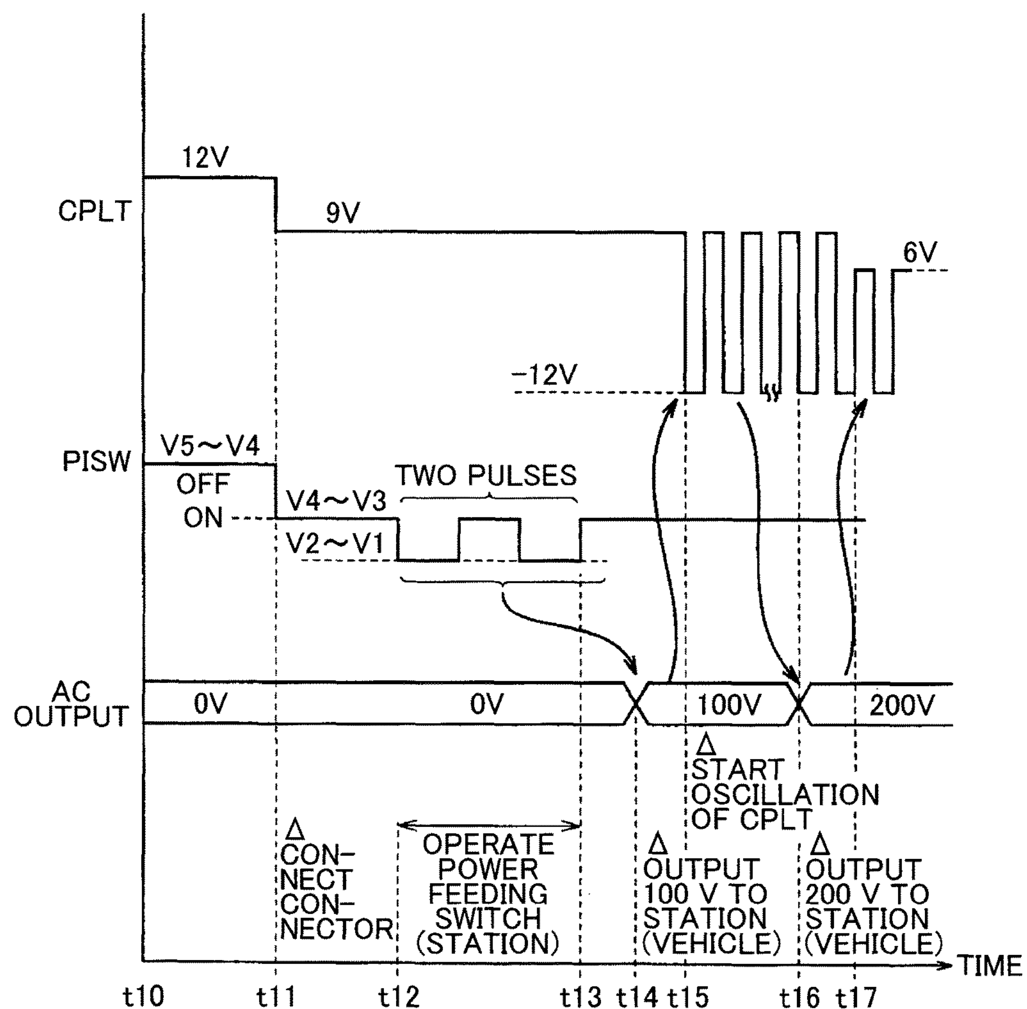
FIG. 10 shows a waveform chart of the control pilot signal CPLT and a waveform chart of a connection signal PISW in the V2H mode.

FIG. 10 shows the waveform chart of the control pilot signal CPLT and the waveform chart of the connection signal PISW in the V2H mode. FIG. 10 shows the waveform of the signal CPLT, the waveform of the connection signal PISW and the voltage of AC output that is supplied from the vehicle to the power station via the inlet in order from above.

As shown in FIG. 5 and FIG. 10, a state where the connector 220 is not connected to the inlet 60 is shown from time t10 to time t11, the potential of the signal CPLT (power station side) is 12 V, and the potential of the signal PISW (vehicle side) falls within the range of V5 to V4.

When the connector 220 is connected to the inlet 60 at time t11, the potential of the signal CPLT changes from 12 V, and the potential of the signal PISW changes from the range of V5 to V4 to the range of V4 to V3.

Between time t12 and time t13, the user presses the power feeding switch 222 of the connector 220 of the power station 200 twice, so two pulses appear in the signal PISW. This is detected by the CPU 51, and a voltage of AC 100 V is generated by the power feeding inverter 32 shown in FIG. 4 at time t14. At this time, alternating-current power is supplied at a predetermined upper limit current (for example, upper limit 15 A).

At the power station 200, the fact that 100 V is output is detected by the voltage sensor 223. At this time, the station-side ECU 229 causes the CPLT oscillating circuit 228 to start oscillating when the setting of the selector switch 210 is set in the V2H mode.

As a result that the CPU 51 detects oscillation of the signal CPLT at time t15, the CPU 51 causes the power feeding inverter 32 shown in FIG. 4 to generate the voltage of AC 200 V at time t16. At this time, the upper limit current is determined on the basis of the duty cycle of the waveform of the signal CPLT.

When the sensor 223 detects that the voltage supplied from the inlet 60 to the connector 220 has changed from 100 V to 200 V at time t16, the station-side ECU 229 recognizes the vehicle as a vehicle type compatible with the V2H mode. As a result that the switch SW3 is closed at the vehicle side, when the station-side ECU 229 detects that the high-level potential of the CPLT signal has changed from 9 V to 6 V, the station-side ECU 229 sets the relay 226 in a connected state, and transmits electric power to the facility, such as a home.

Figure 11A:
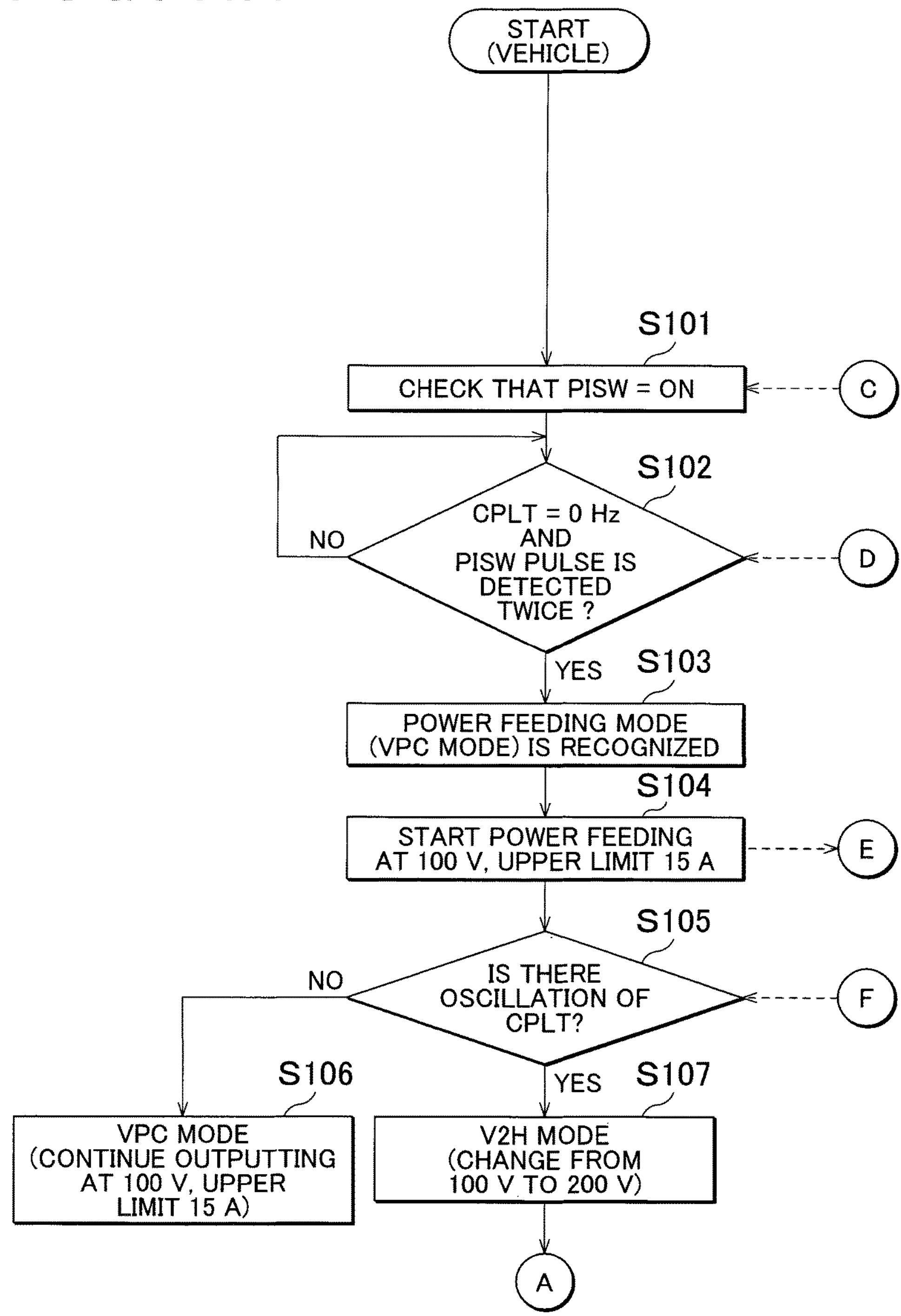
FIG. 11 is a flowchart (first half) for illustrating a control example in a combination of the vehicle compatible with the V2H mode and the power station compatible with the V2H mode.
Figure 11B:
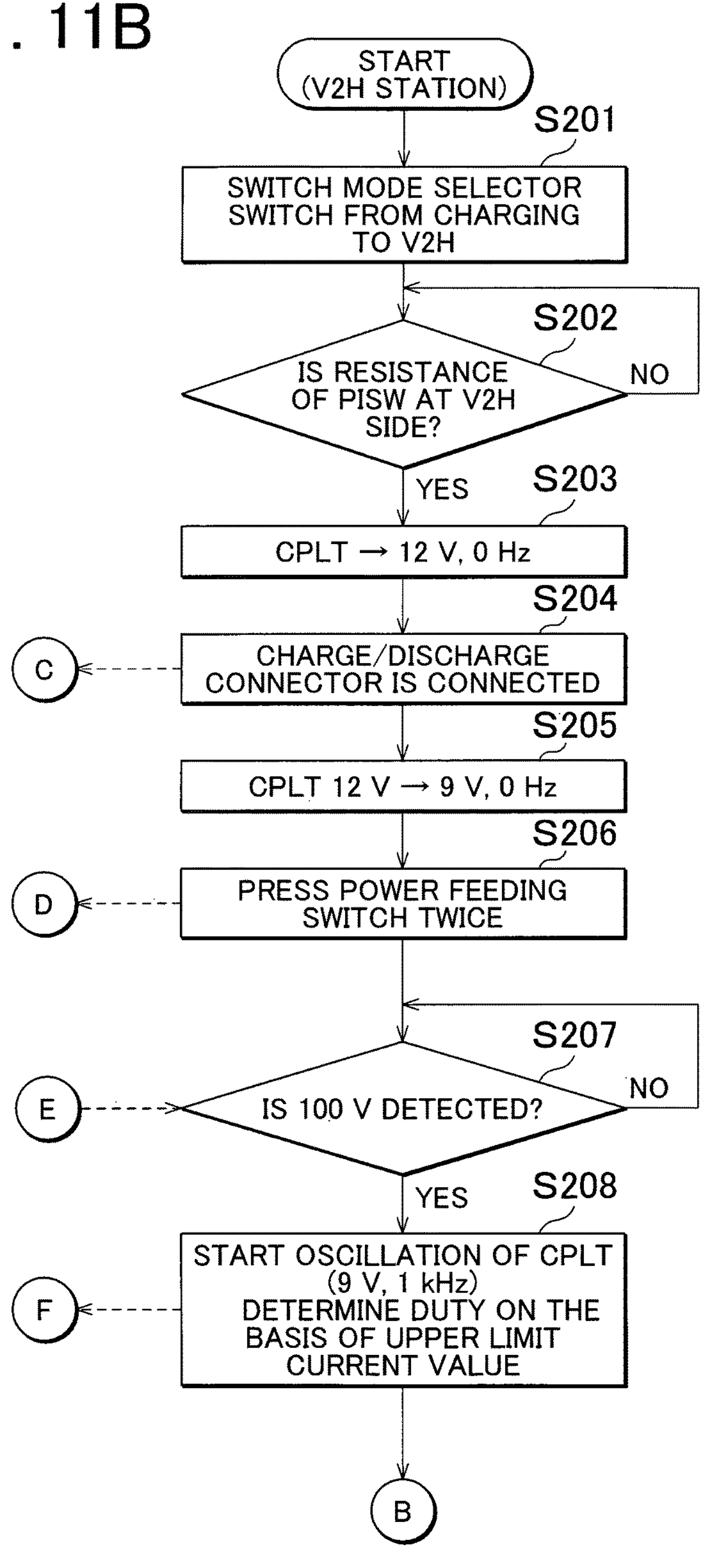

FIG. 11 is a flowchart (first half) for illustrating a control example in a combination of the vehicle compatible with the V2H mode and the power station compatible with the V2H mode.

Figure 12A:
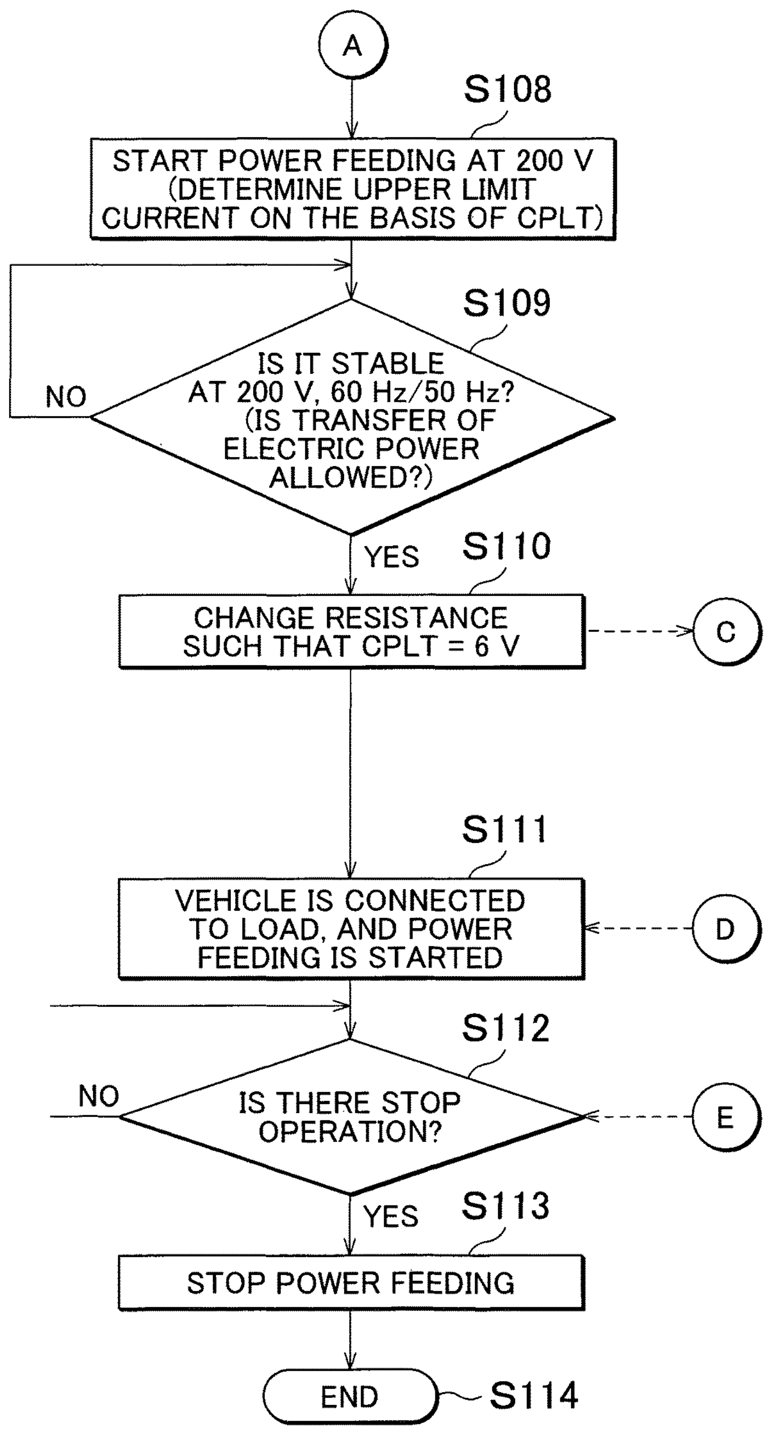
FIG. 12 is a flowchart (second half) for illustrating the control example in the combination of the vehicle compatible with the V2H mode with the power station compatible with the V2H mode.
Figure 12B:
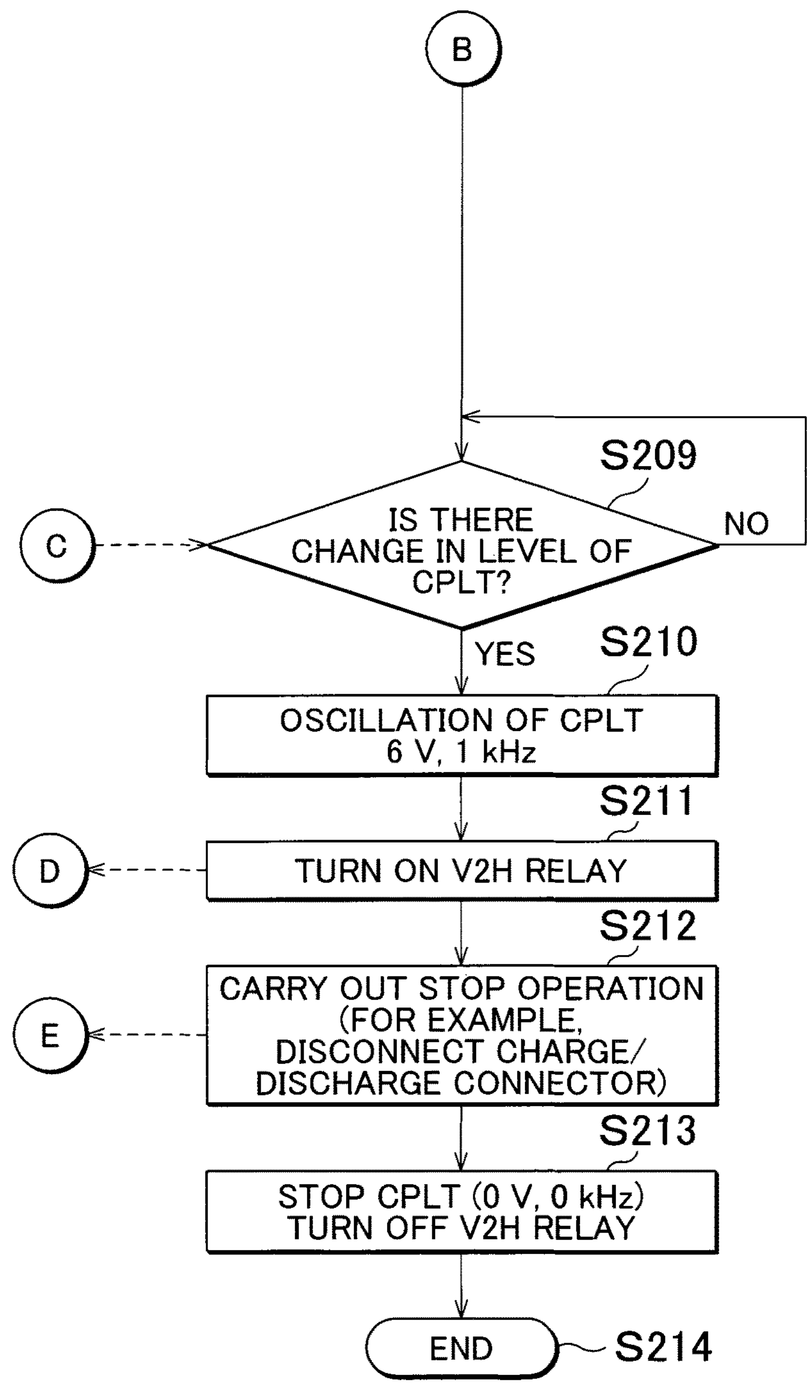

FIG. 12 is a flowchart (second half) for illustrating the control example in the combination of the vehicle compatible with the V2H mode and the power station compatible with the V2H mode.

As shown in FIG. 5 and FIG. 11, at the power station 200, when the selector switch 210 is switched from the charging mode to the V2H mode in step S201, the selector circuit 230 is switched from the C terminal to the S terminal in step S202. Thus, the resistance circuit for determining the potential of the signal PISW is switched from the resistance circuit 212 to the resistance circuit 214 (step S202). In step S203, the connector is not connected to the inlet yet, so the state of the signal CPLT is set to a state of 12 V, 0 Hz (not oscillating) at the power station 200 side.

When the charge/discharge connector 220 is connected to the inlet 60 in step S204, the CPU 51 detects that the connection signal PISW has changed from the off state to the on state in step S101 at the vehicle side. As shown in step S205, the state of the signal CPLT also changes from 12 V to a state of 9 V, 0 Hz (time t11 in FIG. 10).

At the vehicle side, in step S201, the process waits until the condition that the signal CPLT is not oscillating (0 Hz) and two pulses are detected in the signal PISW is satisfied. When the power feeding requesting operation that the user presses the power feeding switch 222 twice is carried out in step S206, the vehicle side recognizes that the operation mode is the power feeding mode in step S103. The power feeding mode includes the VPC mode and the V2H mode. At this time, the vehicle recognizes that the operation mode is the VPC mode, and power feeding is started at AC 100 V, upper limit 15 A in step S104. However, at the power station 200, because the V2H relay 226 is not closed, no electric power is transferred to the home yet.

At the power station 200, after the power feeding requesting operation is carried out in step S206, the process waits for detection of 100 V in step S207. When AC 100 V is detected by the voltage sensor 223 in step S207, the process proceeds to step S208.

In step S208, the station-side ECU 229 causes the CPLT oscillating circuit 228 to start oscillating. Thus, the state of the signal CPLT becomes an oscillating state of 9 V, 1 kHz (time t15 in FIG. 10).

At the vehicle side, it is determined in step S105 whether the signal CPLT is oscillating. When it is determined in step S105 that the signal CPLT is not oscillating, the vehicle determines that the operation mode is the VPC mode, and continues to carry out power feeding at AC 100 V, upper limit 15 A without any change.

On the other hand, when it is determined in step S105 that the signal CPLT is oscillating, the process proceeds to step S107, and the operation mode is determined as the V2H mode. At this time, in step S108, the PLG-ECU 50A controls the power feeding inverter 32 such that the output voltage changes from 100 V to 200 V. The upper limit current at this time is determined on the basis of the duty cycle of the waveform of the signal CPLT. In step S109, the process waits until the voltage of the specified frequency (50 Hz or 60 Hz) at 200 V becomes stable and electric power becomes transmittable, and, when the voltage becomes stable and electric power becomes transmittable, the resistors are changed in step S110 such that the high-level potential of the signal CPLT becomes 6 V (time t17 in FIG. 10). Specifically, the switch SW3 is closed by the CPU 51 shown in FIG. 5. Thus, the resistance value of the resistance circuit 132 is changed.

At the power station 200, in step S209, the process waits for detection of the fact that the high-level potential of the signal CPLT is changed. When the level change is detected in step S209, the state of the signal CPLT is an oscillating state of 6 V, 1 kHz as described in step S210. In response to detection of this state, the station-side ECU 229 shown in FIG. 5 turns on the V2H relay 226. Thus, the vehicle is connected to the load (facility, such as a home) in step S111, and power feeding from the vehicle to the load is started.

At the vehicle, during power feeding, the process waits for stop operation in step S112. When stop operation, such as disconnecting the connector 220 from the inlet 60, is carried out by the user at the power station 200 side in step S212, the process proceeds from step S112 to step S113 at the vehicle side, power feeding is stopped in step S113, and the process ends in step S114.

At the power station 200 side as well, in response to the fact that stop operation is carried out in step S212, the signal CPLT is set to a stopped state (0 V, 0 Hz) in step S213, the V2H relay 226 is turned off, and the process ends in step S214.

As described above, with the vehicle according to the present embodiment, it is possible to distinguish various connectors, and it is possible to exchange electric power in response to a request from each connector.

With the power station according to the present embodiment, it is possible to exchange electric power with a vehicle in accordance with various types of vehicles.

Lastly, the present embodiment will be summarized with reference to the accompanying drawings again. As shown in FIG. 1, FIG. 4 and FIG. 5, the vehicle 100 includes the electrical storage device B, the inlet 60, the control device 50 and the power converter 30. The inlet 60 is configured to be able to feed electric power to an external device and to charge the electrical storage device B. The control device 50 determines whether the connector connected to the inlet 60 is a charge connector for charging the electrical storage device B or a discharge connector for feeding electric power to the external device on the basis of a first signal that is supplied via the inlet 60, and determines whether the discharge connector is a power extracting connector (VPC 220A) for carrying out power feeding to a single load or a facility connector (charge/discharge connector 220) for carrying out power feeding to a facility on the basis of a second signal that is supplied via the inlet 60 when the control device determines that the connector is the discharge connector. The power converter 30 exchanges electric power between the inlet 60 and the electrical storage device B on the basis of instructions from the control device 50.

Preferably, the first signal is transmitted by using a proximity detection signal (signal PISW) that is used to detect that the connector is connected to the inlet 60. As shown in FIG. 10, the first signal may be two pulses that are superimposed on the signal PISW. The second signal is transmitted by using a control pilot signal (signal CPLT) that is used to inform a charging condition to a charging facility outside the vehicle at the time of charging. As shown in FIG. 10, the second signal may be generated by oscillating the signal CPLT.

Preferably, the control device 50 controls the power converter 30 such that electric power is fed from the inlet 60 at a predetermined upper limit current (for example, a fixed upper limit of 15 A) when the control device 50 determines that the connector connected to the inlet 60 is the power extracting connector (VPC 220A in FIG. 1), and controls the power converter 30 such that electric power is fed from the inlet 60 at an upper limit current determined on the basis of the second signal when the control device 50 determines that the connector connected to the inlet 60 is the facility connector (charge/discharge connector 220).

Preferably, the control device 50 controls the power converter 30 such that a first supply voltage (for example, AC 100 V) is output to power terminals of the connector when the control device 50 determines that the connector is the discharge connector, and causes the power converter 30 to change the first supply voltage (for example, from AC 100 V to AC 200 V) when the control device 50 determines that the discharge connector is the facility connector thereafter.

Another aspect of the present embodiment relates to a power receiving device (power station 200) configured to be able to output charging power to the vehicle 100 and to receive electric power from the vehicle 100. As shown in FIG. 5, the power station 200 includes the connector 220, a circuit (the CPLT oscillating circuit 228 and the resistance circuit 214), and the station-side ECU 229. The connector 220 is connectable to the inlet 60 of the vehicle 100. The circuit is able to transmit the first signal and the second signal to the vehicle 100 via the connector 220. The station-side ECU 229 causes the circuit to transmit the second signal after the first supply voltage (for example, AC 100 V) is supplied from the vehicle 100 to the power terminals of the connector 220, and determines that the vehicle 100 connected to the connector 220 is of a vehicle type that is able to feed electric power to a facility (for example, a home, or the like) placed outside the vehicle when the station-side ECU 229 detects that the first supply voltage has been changed to the second supply voltage (for example, AC 200 V) in response to the second signal.

Preferably, the first signal is transmitted by using a proximity detection signal (signal PISW) that is used to detect that the connector 220 is connected to the inlet 60, and the second signal is transmitted by using a control pilot signal (signal CPLT) that is used to inform a charging condition to a charging facility outside the vehicle at the time of charging.

Preferably, the power station 200 further includes an operating unit (power feeding switch 222) for operation to transmit the first signal. The circuit includes the resistance circuit 214 and the CPLT oscillating circuit 228. The resistance circuit 214 transmits the first signal in response to operation of the operating unit (pressing the power feeding switch 222 twice). The CPLT oscillating circuit 228 transmits the second signal by changing from an oscillation stopped state to an oscillating state.

The embodiments described above are illustrative and not restrictive in all respects. The scope of the invention is defined by the appended claims rather than the description of the above embodiments. The scope of the invention is intended to encompass all modifications within the scope of the appended claims and equivalents thereof.

What is claimed is:

1. A vehicle comprising:

an electrical storage device;

an inlet configured to feed electric power to an external device or charge the electrical storage device when a connector is connected to the inlet;

a power conversion unit configured to exchange electric power between the inlet and the electrical storage device; and an ECU configured to:

(a) determine, based on a value of a first signal that is supplied via the inlet, whether the connector connected to the inlet is a charge connector for charging the electrical storage device or a discharge connector for feeding electric power to an external device, the ECU determining that the connector connected to the inlet is the charge connector when the value of first signal is within a first range and determining that the connector connected to the inlet is the discharge connector when the value of first signal is within a second range that is different from the first range;

(b) in a case where the ECU determines that the connector is the discharge connector, determine, based on a second signal that is supplied via the inlet, whether the discharge connector is a power extracting connector for feeding electric power at a predetermined upper limit current to a load outside the vehicle or a V2H connector for feeding electric power at a variably set upper limit to a home; and (c) control an exchange of electric power between the inlet and the electrical storage device with the use of the power conversion unit based on the determination of the connector.

2. The vehicle according to claim 1, wherein the first signal is a proximity detection signal that is used to detect that the connector is connected to the inlet, and the second signal is a control pilot signal that is used to inform a charging condition to a charging facility outside the vehicle at the time of charging.

3. The vehicle according to claim 1, wherein the ECU is configured to:

(d) control the power conversion unit such that electric power is fed from the inlet at the predetermined upper limit current in a case where the ECU determines that the connector connected to the inlet is the power extracting connector; and (e) control the power conversion unit such that electric power is fed from the inlet at the upper limit current determined based on the second signal in a case where the ECU determines that the connector connected to the inlet is the V2H connector.

4. The vehicle according to claim 1, wherein the ECU is configured to:

(f) control the power conversion unit such that a supply voltage that is output to power terminals of the connector becomes a first supply voltage in a case where the ECU determines that the connector is the discharge connector; and (g) control the power conversion unit such that the supply voltage that is output to the power terminals of the connector changes from the first supply voltage in a case where the ECU subsequently further determines that the discharge connector is the V2H connector.

5. A power receiving device for outputting charging power to an electrical storage device provided on a vehicle and receiving electric power from the electrical storage device, the power receiving device comprising:

a connector configured to be connected to an inlet of the vehicle;

a power line configured to feed electric power from the connector to a home;

a relay provided on the power line;

a circuit configured to transmit a first signal and a second signal to the vehicle via the connector;

a supply voltage detector configured to detect a level of a voltage that is supplied from the vehicle to power terminals of the connector; and an ECU configured to:

(i) determine whether the supply voltage detector detects that the voltage supplied from the vehicle to the power terminals of the connector is a first supply voltage;

(ii) cause the circuit to transmit the second signal to the vehicle via the connector after determining that the supply voltage detector detects that the voltage supplied from the vehicle to the power terminals of the connector is the first supply voltage;

(iii) determine that the vehicle connected to the connector is of a vehicle type that is able to feed electric power to a facility located outside the vehicle when the supply voltage detector detects that the voltage that is supplied from the vehicle to the power terminals of the connector has changed from the first supply voltage to a second supply voltage higher than the first supply voltage in response to the second signal; and (iv) set the relay in a connected state in a case where the ECU determines that the vehicle connected to the connector is the vehicle type that is able to feed electric power to the facility located outside the vehicle.

6. The power receiving device according to claim 5, wherein the first signal is a proximity detection signal that is used to detect that the connector is connected to the inlet, and the second signal is a control pilot signal that is used to inform a charging condition to a charging facility outside the vehicle at the time of charging.

7. The power receiving device according to claim 5, further comprising an operating unit configured to carry out operation for transmitting the first signal, wherein the circuit includes a first circuit that transmits the first signal in response to operation of the operating unit and a second circuit that transmits the second signal by changing from an oscillation stopped state to an oscillating state.

* * * * *